US006947743B2

(12) United States Patent
Aitken et al.

(10) Patent No.: US 6,947,743 B2
(45) Date of Patent: Sep. 20, 2005

(54) SHORT MESSAGE GATEWAY WITH INTERWORKING FOR NON-COMPATIBLE NETWORKS

(75) Inventors: David James Aitken, Dublin (IE); Martin McGrath, Mohill (IE); Louis Corrigan, Enfield (IE)

(73) Assignee: Markport Limited, Dublin (IE)

( * ) Notice: Subject to any disclaimer, the term of this patent is extended or adjusted under 35 U.S.C. 154(b) by 550 days.

(21) Appl. No.: 10/096,099

(22) Filed: Mar. 13, 2002

(65) Prior Publication Data

US 2002/0173320 A1 Nov. 21, 2002

Related U.S. Application Data

(63) Continuation of application No. PCT/IE00/00107, filed on Sep. 18, 2000.

(30) Foreign Application Priority Data

Sep. 17, 1999 (IE) .................................................. 99/0776
Sep. 18, 2000 (IE) .......................................... 2000/0748

(51) Int. Cl.[7] .............................................. H04Q 7/00
(52) U.S. Cl. .................................. 455/432.2; 455/560
(58) Field of Search .......................... 455/432.1, 432.2, 455/466, 560

(56) References Cited

U.S. PATENT DOCUMENTS

| 5,878,397 | A | * | 3/1999 | Stille et al. ................. 455/466 |
| 5,903,726 | A | * | 5/1999 | Donovan et al. ........... 709/206 |
| 5,946,629 | A | * | 8/1999 | Sawyer et al. .............. 455/466 |
| 6,163,546 | A | | 12/2000 | Sipila ......................... 370/466 |
| 6,463,292 | B1 | * | 10/2002 | Rahman ..................... 455/466 |
| 6,611,516 | B1 | * | 8/2003 | Pirkola et al. .............. 370/352 |

FOREIGN PATENT DOCUMENTS

| DE | 19602449 A1 | 8/1996 |
| WO | WO00/42790 | 7/2000 |

* cited by examiner

*Primary Examiner*—Nick Corsaro
(74) *Attorney, Agent, or Firm*—Jacobson Holman PLLC

(57) ABSTRACT

A short message gateway comprises a gateway function (SMGF) and programs in an HLR or a home network (IMT-2000). It does not have any physical impact on a foreign (PDC) network, and it converts short messages communicated between the home and foreign networks. The gateway function (SMGF) primarily inter-operates with an HLR and an SMSC of the home network, the GMSC providing the link to the foreign network. The gateway allows communication in a wide variety of scenarios for communication with subscribers in the home and foreign networks and roaming subscribers from one to the other.

11 Claims, 12 Drawing Sheets

Short Message from an IMT-2000 SMSC to an IMT-2000 Subscriber roaming in the PDC Network

IMT-2000 Mobile Terminated Short Messages – Destined for the PDC Network

Fig. 1

PDC Mobile Terminated Short Messages – Destined for IMT-2000 Networks

Fig. 2

Mobile Originated Short Message – IMT-2000 Subscriber roaming in PDC Network

Fig. 3

SMGF Protocol Stacks for IMT-2000 – PDC Short Message Inter-Working

Fig. 4

Short Message from an IMT-2000 SMSC to an IMT-2000 Subscriber in the IMT-2000 Network

Fig. 5

Short Message from an IMT-2000 SMSC to an IMT-2000 Subscriber roaming in the PDC Network

Fig. 6

Short Message from an IMT-2000 SMSC to a PDC Subscriber in the PDC Network

Fig. 7

Short Message from a PDC SMSC to a PDC Subscriber in the PDC Network

Fig. 8

Short Message from a PDC SMSC to an IMT-2000 Subscriber in the IMT-2000 Network

Fig. 9

Short Message from a PDC SMSC to an IMT-2000 Subscriber roaming in the PDC Network

Fig. 10

Short Message from a PDC SMSC to a PDC subscriber with a ported IMT-2000 number in the PDC Network

Fig. 11

Short Message from a IMT-2000 Subscriber in the IMT-2000 Network to it's home IMT-2000 SMSC

Fig. 12

Short Message from a IMT-2000 MS or a Ported PDC Subscriber roaming in the PDC Network to it's home IMT-2000 SMSC

Fig. 13

Short Message from a PDC Subscriber or a Ported IMT-2000 Subscriber in the PDC Network to it's home PDC SMSC

Fig. 14

SHORT MESSAGE GATEWAY WITH INTERWORKING FOR NON-COMPATIBLE NETWORKS

This is a continuation of PCT/IE00/00107 filed Sep. 18, 2000 and published in English.

FIELD OF THE INVENTION

The invention relates to transfer of short messages between non-compatible networks such as PDC and IMT-2000 networks. In this specification these two network types are used as examples to describe signal transfers.

PRIOR ART DISCUSSION

At present, communication of short messages between non-compatible networks is complex and error-prone.

The invention is therefore directed towards providing a gateway to improve such communication to the extent of achieving transparency.

Short message transparency between PDC and IMT-2000 networks in this specification means the ability for short message service centres, served by their home technology to send short messages to handsets served by a foreign technology, and for handsets in a foreign technology to send short messages to their home short message service centres served by their home technology. Thus, in the PDC/IMT-2000 context, the invention is directed towards achieving short message subscriber transparency as follows.

IMT-2000 subscribers, while in the IMT-2000 network, will be able to send short messages to:
  a) PDC subscribers in a PDC network
  b) IMT-2000 subscribers in an IMT-2000 network
  c) IMT-2000 subscribers roaming onto a PDC network
  d) Any other subscriber in any other IMT-2000 or GSM network with whom the IMT-2000 operator has appropriate inter-working agreements IMT-2000 subscribers, while in the IMT-2000 network, will be able to receive short messages from:
  a) PDC subscribers in a PDC network
  b) IMT-2000 subscribers in an IMT-2000 network
  c) IMT-2000 subscribers roaming onto a PDC network
  d) Any other subscriber in any other IMT-2000 or GSM network with whom the IMT-2000 operator has appropriate inter-working agreements IMT-2000 subscribers, while roaming onto a PDC network, will be able to send short messages to:
  a) PDC subscribers in a PDC network
  b) IMT-2000 subscribers in an IMT-2000 network
  c) IMT-2000 subscribers roaming onto a PDC network
  d) Any other subscriber in any other IMT-2000 or GSM network with whom the IMT-2000 operator has appropriate inter-working agreements IMT-2000 subscribers, while roaming onto the PDC network, will be able to receive short messages from:
  a) PDC subscribers in a PDC network
  b) IMT-2000 subscribers in an IMT-2000 network
  c) IMT-2000 subscribers roaming onto a PDC network
  d) Any other subscriber in any other IMT2000 or GSM network with whom the IMT-2000 operator has appropriate inter-working agreements.

A subscriber's home Short Message Service Centre (SMSC) is the SMSC that handles that subscriber's mobile originated short messages. Specifically, an IMT-2000 subscriber's home SMSC is in the IMT-2000 network even when roaming onto the PDC network. A PDC subscriber's home SMSC is in the PDC network.

SUMMARY OF THE INVENTION

Statements of Invention

According to the invention, there is provided a short message gateway comprising a gateway function (SMGF) comprising means for inter-working with entities of non-compatible networks and for performing short message format conversion between the networks.

In one embodiment, the gateway function comprises means for inter-working between a plurality of similar networks on one side and a different, non-compatiable, network on the other side.

In another embodiment, the gateway function comprises means for residing in a home network and for performing inter-working functions between the home network and a foreign network without modification of the foreign network.

In a further embodiment, the gateway function comprises means for communicating with the foreign network via a gateway mobile switching centre (G-MSC) in the home network.

In one embodiment, the gateway further comprises means in a Home Location Register (HLR) of the home network for returning an address for the gateway function as a serving VMSC or as a home SMSC, depending on the nature of the signals.

In one embodiment, the HLR comprises means for providing to the gateway function a MSRN of a roaming subscriber in a foreign network.

In one embodiment, the HLR comprises means for providing the gateway function with routing data for a call to a foreign subscriber.

In one embodiment, the gateway function further comprises means for capturing short message statistical data at configurable intervals.

In one embodiment, the gateway function comprises means for maintaining a table of corresponding message classes and tele-services, and for using said table for message class and tele-services conversion.

In one embodiment, the gateway function comprises a programmable mapping function between data coding schemes, said mapping function being controlled by instructions in the form of operator commands and a configuration file.

In a further embodiment, the gateway function comprises means for converting a release message into independent messages.

In a still further embodiment, the gateway function comprises means for segmentation of messages if a network has a shorter maximum message length than another network.

In one embodiment, the gateway function comprises means for maintaining a network transaction log of diagnostic data.

DETAILED DESCRIPTION OF THE INVENTION

Brief Description of the Drawings

The invention will be more clearly understood from the following description of some embodiments thereof given by way of example only with reference to the accompanying drawings in which:—

Description of the Embodiments

Figure 1:
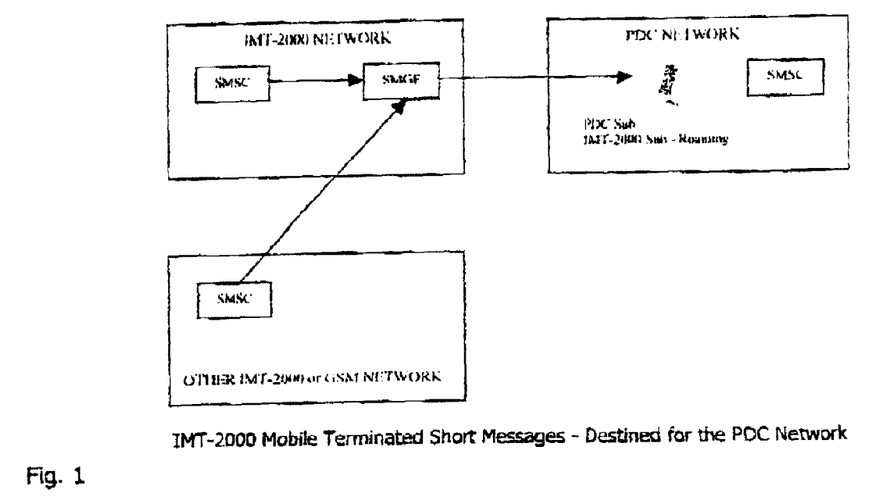
FIGS. 1 to 4 are overview diagrams illustrating a short message gateway system of the invention.
Figure 2:
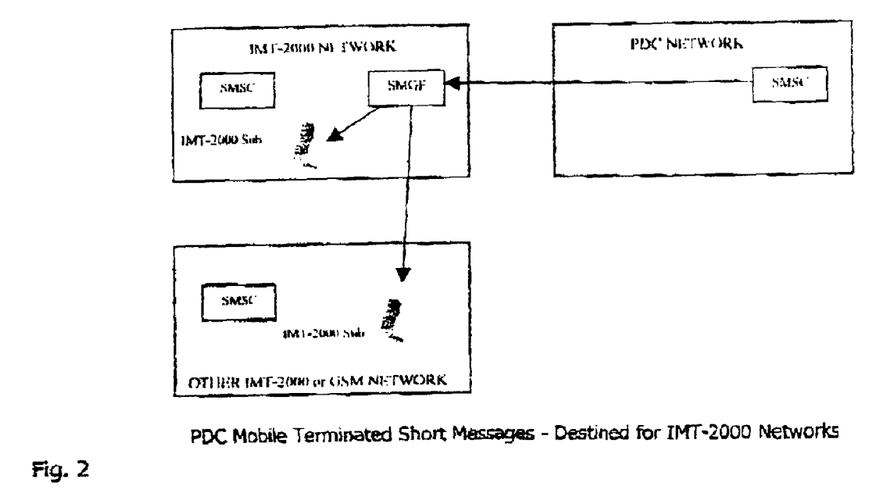

The invention provides a short message gateway comprising a gateway function (SMGF) and components of other network elements. The SMGF is a gateway function through which all short messages between the networks are routed. The SMGF is responsible for mediating between the different protocols and elements of procedure and for converting short messages to the appropriate format and onward routing to the destination network. This is shown in FIGS. 1 and 2.

The SMGF resides as a separate entity in the IMT-2000 network, which has roaming agreements with the PDC networks. The SMGF places no infrastructure requirements on the PDC networks.

PDC SMSC short messages, destined for an IMT-2000 network and IMT-2000 SMSC short messages, destined for a PDC network, are all routed to the SMGF. The SMGF performs routing enquiries to determine the location of the destination handset. Once the destination network of the handset has been determined the SMGF then carries out the appropriate conversion between the PDC short message and the IMT-2000 short message format and forwards the short message towards the serving VMSC.

Figure 3:
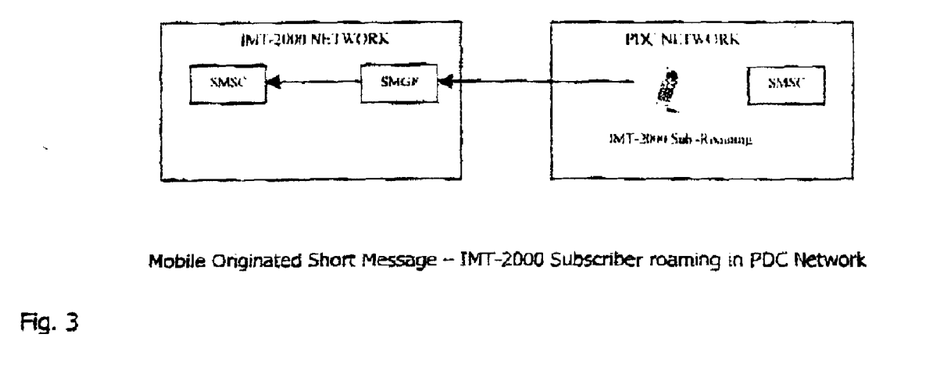
Figure 4:
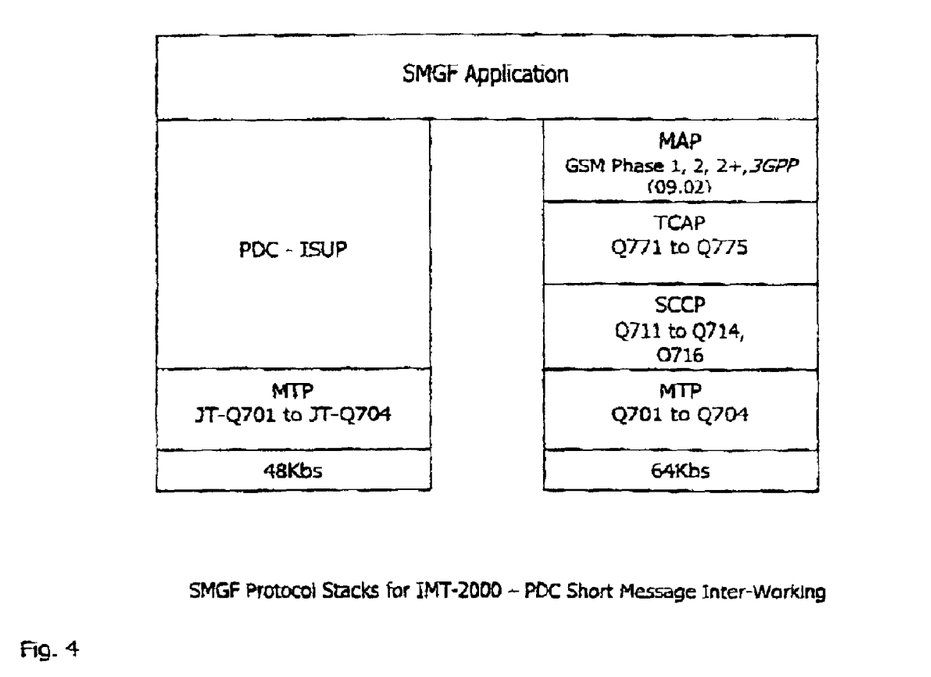

Mobile originated short messages from IMT-2000 subscribers roaming onto the PDC network are delivered to and managed from the home IMT-2000 SMSC in the IMT-2000 network. This is depicted in FIG. 3. Referring to FIG. 4, the SMGF comprises an SMG application over a PDC stack comprising PDC-ISUP, and MTP layers and an IMT-2000 stack comprising MAP, TCAP, SCCP, and MTP layers.

The SMGF is programmed to determine by what type of network a subscriber is being served (i.e. IMT-2000 or PDC) and to route short messages accordingly. It supports the interface protocols to allow it to inter-work with specific network entities in both the IMT-2000 network and the PDC networks. It interfaces to the PDC network over PDC ISUP and to the IMT-2000 network over GSM MAP. In addition the SMGF supports functionality to perform short message format conversion between IMT-2000 and PDC.

Depending on the scenario, the SMGF appears as either a serving VMSC, or a home SMSC. In all scenarios its function is to mediate between the different protocols and elements of procedure and to relay the message onwards and to translate the results. It does not store the messages and, therefore, there is no database of messages.

An important feature of the SMGF architecture is that it allows subscribers from "other IMT-2000 networks" for example those outside of Japan, to send short messages to PDC subscribers. Similarly, PDC subscribers could also send short messages to IMT-2000 subscribers of other IMT-2000 networks. These other IMT-2000 networks would not require a SMGF node, instead all short messages could be routed to the IMT-2000 network, which has the SMGF node and routed onwards from there.

A fundamental principle of short messaging is that all short messages are handled by a short message service centre (SMSC). There are two basic scenarios as follows:

MO Mobile Originated. In these scenarios a subscriber uses his/her mobile to generate a short message and sends it to his/her home SMSC (as programmed in their SIM card or handset). The scenarios all involve the delivery of a short message from a serving MSC to a short message service centre.

All IMT-2000 subscribers will have the IMT-2000 SMSC as their home SMSC. All PDC subscribers will use the PDC SMSCs in their subscription network.

MT Mobile Terminated. In these scenarios an SMSC delivers a short message to a mobile. These scenarios all involve delivery of short messages from an SMSC to a serving VMSC. MT short messages do not necessarily originate from a mobile subscriber.

The basic inter-working requirements are:

Any PDC SMSC in the partner networks may send short messages to a mobile served by an IMT-2000 MSC.

Any IMT-2000 SMSC may send short messages to a mobile served by a PDC MSC in one of the partner networks.

Any PDC MSC in the partner networks may send short messages to the IMT-2000 SMSC(s).

The scenarios are complicated by the roaming and porting possibilities:

An IMT-2000 subscriber may be roaming in a PDC network.

An IMT-2000 number may have ported to a PDC subscription

A PDC number may have ported to an IMT-2000 subscription

As there is no roaming from PDC to IMT-2000, there is never a requirement for an IMT-2000 MSC to send a short message to a PDC SMSC. For the scenarios described, the following network elements and functions are identified:

IMT-2000

HLR: IMT-2000 HLR for both circuit switched and packet switched IMT-2000 subscribers.

SMSC: Any IMT-2000 short message service centre

GMSC: A gateway MSC. In all the following scenarios, it refers to a gateway MSC interfacing with a PDC network.

PDC

SMSC Any PDC short message service centre

HLR The HLR of a PDC subscriber.

GLR Gateway Location Register—A pseudo HLR that handles subscribers roaming from other networks. Specifically an IMT-2000 subscriber, roaming in a PDC network will receive a ROaming Number (RON) from it's home HLR, which is used to query the GLR for routing instructions.

IW-MSC The MSC which interworks with the PDC SMSC.

VMSC The MSC serving a PDC subscriber.

GMSC A gateway MSC. In all the following scenarios, it refers to a gateway MSC interfacing with the IMT-2000 network.

In IMT-2000 networks all short message delivery is handled using 3GPP MAP operations. These are an evolution of the current GSM standards. For a mobile originated short message, the mobile station sends the message specifying the telephone number of the SMSC (usually the home SMSC). The serving MSC sends an MO_FSM (Mobile Originated Forward Short Message) MAP operation to the home SMSC, which then handles delivery. For a mobile terminated short message from an IMT-2000 SMSC, the SMSC requests routing information from the HLR about the recipient mobile. Interconnection agreements permit some operators to query HLRs in other operators' domains. If the mobile is believed to be active, the HLR responds with the identification of the serving MSC to which the short message should be sent.

In the partner PDC networks all short messages are sent in the call-user-data field of an ISDN pseudo call set-up (without any voice path being established). Short messages are distinguished from normal call set-up by a special Calling Party's Category value in the ISUP IAM operation. For mobile originated calls, the PDC handset sets up a pseudo call via the serving MSC to the PDC SMSC. For mobile terminated calls, the SMSC sets up a pseudo call via the IW-MSC to the PDC handset.

The SMGF is not involved in the end-to-end application procedures. It assumes that the handsets will handle any messages sent to them. The SMGF may provide the functionality to perform a filtering, or conditional passage or blocking of messages according to some configurable criteria, such as the originating subscriber or service number or number group. IMT-2000 short messages have a maximum length of 140 octets whereas PDC short messages have a maximum length of 128 octets. In order to facilitate the deliver of short messages of length greater than 128 octets, from an IMT-2000 SMSC to a subscriber in the PDC network the short message is segmented into lengths of 128 octets or shorter and delivered as two separate short messages. These two short messages will then be re-assembled on the PDC handset.

PDC short messaging has a concatenation tele-service, which allows the segmentation and re-assembly of short messages. By using the concatenation tele-service the handset can determine whether or not it has received all segments of the short message and return an appropriate response indicating this. The SMGF may incorporate functionality which will perform the concatenation and segmentation of messages being passed between the diverse networks where necessary. This functionality, where existing in the SMGF could also be enabled or disabled conditionally by the operator of the SMGF.

Regarding data coding schemes, the PDC short message specification defines a number of Data Coding Schemes that can be used for encoding short message user data, for example ASCII, Shift, Shift JIS and PDC encoding to name a few. The data coding schemes supported by IMT-2000 for short messaging are defined in GSM 03.38. These include Default Alphabet, 8 bit encoding and Unicode. It is also possible to define a user specific data coding scheme.

If a PDC short message is sent to an IMT-2000 handset with user data encoded in a format not supported by the IMT-2000 handset then it will not be interpreted properly. Similarly an IMT-2000 short message sent to a PDC handset may contain user data encoding that is not supported by the PDC handset and again the short message will not be interpreted properly. The exact handling of such messages by the handset is a matter for the network operators to decide.

However for certain short messages it may be desirable to carry out a conversion between data coding schemes to allow a short message to be delivered to, and interpreted by, a handset successfully.

The SMGF incorporates a level of functionality to perform data coding scheme conversions, which allows messages of different data coding schemes to be passed between technologies. Additionally, the SMGF could carry out handling procedures to either accept or reject a short message depending on its destination and data coding scheme used.

It is assumed that a handset receiving a short message with a particular message class (such as Skywalker, Relay Mail, Co-Ordinator, Hotline etc) will be capable of performing the appropriate procedures and return appropriate acknowledgements. The SMGF maintains a simple table to convert between PDC message classes and tele-services into the IMT-2000 equivalents. The SMGF also comprises an advanced programmable mapping function between data coding schemes which is controlled by instructions in the form of operator commands and a configuration file.

Two-way messaging is a tele-service of PDC short messaging. It is assumed that an IMT-2000 handset, on receipt of such short messages, will be capable of performing appropriate procedures and return any replies as independent short messages.

In PDC, the reply from a two way message is contained in the REL(ease) message. The SMGF converts such replies into an independent message in the IMT-2000 domain; they will be addressed to the sender of the original message via the SMSC through which it was sent.

The following list summarises functional features of the SMGF.

Support for 3GPP MAP
Support for PDC ISUP
IMT-2000 short message to PDC short message conversion logic
PDC short message to IMT-2000 short message conversion logic
Segmentation of IMT-2000 short messages
Short message and call routing functionality
Data Coding Scheme conversion functionality
Message Class and Two-Way messaging handling functionality
Support for prefix mapping table The SMG comprises a data capture program and a database for collecting statistics and making these available for external analysis. Statistics are collected at a configurable periodic interval (e.g. 5–15 minutes). Statistics include:

MAP Statistics
ISUP Statistics
UNIX Statistics
TCAP Statistics
SCCP and MTP Statistics
Statistics on each scenario The SMGF maintains a network transaction log for system diagnostics. The diagnostic data is captured according to parameters such as integrity of received messages and timing of bursts of excessive numbers of messages. It is possible for these logs to be restricted to just one scenario. The SMGF provides event and fault monitoring capabilities as well as a general capability to view the status of the whole system. The SMGF supplies appropriate operations and support interfaces for network management purposes to monitor the health of the platform.

The following summarises the impacts on core network elements in the IMT-2000 domains to support the short message gateway architecture. No modifications are needed to the PDC network infrastructure.

A gateway switch serving as an interconnect to a PDC network or that can be expected to process an incoming call from a PDC network, must be able to recognise the special PDC call set-up attempts used to convey short messages and divert such calls to the short message gateway. Such call attempts can be identified by the CPC(Calling Party Category) in the ISUP IAM operation.

Two values are specified, one for IAM's relaying PDC Mobile Originated Short Messages, and one for IAM's relaying PDC Mobile Terminated Short Messages. For PDC Mobile Originated Short Messages the CPC will indicate SME(Short Message Entity) i.e. the PDC handset and for Mobile Terminated Short Messages the CPC will indicate SMSC. The IMT-2000 Gateway MSC must be able to redirect IAM's from the PDC network containing either of these CPC settings to the SMGF.

The Calling Party's Category parameter code in binary is 00001001. It is a mandatory, fixed length (one byte) parameter in an ISUP IAM operation. The values used for PDC short messages are:

Mobile Terminated 11111100 (0×FC)
Mobile originated 11111101 (0×FD)

The SMGF requires that an IMT-2000 HLR, when queried for routing information, returns specific information to allow the correct routing of pseudo calls and short messages.

In an IMT-2000 network, an IMT-2000 SMSC needs to know the address of the serving VMSC of the handset in order to deliver a short message. This information is obtained by sending a SRI_SM (Send Routing Information for Short Message) enquiry to the IMT-2000 HLR. The IMT-2000 HLR will respond with a SRI_SM response which will contain the address of the serving VMSC. The IMT-2000 SMSC will then forward the short message to the VMSC address received using a FSM(Forward Short Message).

If the destination handset is located in a PDC network the short message needs to be routed to the SMGF first in order to carry out the procedures required for delivering a short message in PDC format. Therefore, in this case, the IMT-2000 HLR when queried for a SRI_SM must return the address of the SMGF as the serving VMSC address in an SRI_SM response. Specifically, the IMT-2000 HLR in response to a SRI_SM enquiry, must return the SMGF address as the serving VMSC address in an SRI_SM response when the queried subscriber is:

a PDC subscriber
an IMT-2000 subscriber roaming onto a PDC network

In PDC networks short messages are delivered using pseudo calls, which carry the short message as user data. Therefore routing of short messages in PDC networks is similar to the routing of voice calls, i.e. the MSC queries the HLR or GLR, depending on the subscriber, for routing information to the serving VMSC. The HLR/GLR will return the PRN (Pursuit Routing Number) which is used to route the call to the serving VMSC.

As explained above, short messages from an IMT-2000 SMSC destined for a handset in the PDC network must first be routed to the SMGF. The SMGF must then obtain routing information from the IMT-2000 HLR to set-up a pseudo call towards the PDC network. This routing information is obtained by sending a SRI (Send Routing Information) request to the IMT-2000 HLR for a specific subscriber. The IMT-2000 HLR will respond with a SRI response indicating the MSRN(Mobile Station Roaming Number), which is a number that is used to route the call to a serving VMSC.

There are two types of subscriber which can receive short messages in the PDC network, these are PDC subscribers and IMT-2000 subscribers roaming onto the PDC network. Furthermore these subscribers could have ported numbers.

Because of number porting between the PDC and IMT-2000 networks, calls originating in the IMT-2000 network destined for either an IMT-2000 or a PDC number must first be queried towards the IMT-2000 HLR. In the case that no entry exists in the IMT-2000 HLR for the queried number the IMT-2000 HLR needs to return a response to indicate to what network, if any, the call should be routed. For this reason the IMT-2000 HLR needs to have knowledge of numbers ported into and out of the IMT-2000 network.

Specifically, the IMT-2000 HLR is required to return appropriate information for pseudo calls to PDC subscribers to indicate the PDC Subscriber Type i.e. is the PDC subscriber using a ported IMT-2000 number and if so which network is it ported. Based on this information the SMGF attaches a suitable prefix to the called subscriber number and routes the pseudo call to the IMT-2000 GMSC. The IMT-2000 GMSC will be responsible for interpreting the prefix and carrying out routing to the appropriate PDC network.

In the case of a query for an IMT-2000 subscriber roaming onto a PDC network, the IMT-2000 HLR is required to return the PDC roaming number supplied by the PDC GLR i.e. the RON(Roaming Number). The SMGF will use this RON in the Called Party Address of a pseudo call setup towards the IMT-2000 GMSC. The IMT-2000 GMSC is responsible for correctly routing the pseudo call to the correct PDC network where the PDC network will carry out the pseudo call setup to the roaming IMT-2000 subscriber.

The following table summarises the responses required by the SMGF from the IMT-2000 HLR for SRI_SM and SRI enquiries.

| Subscriber | Location | SRI_SM Ack | SRI Ack |
|---|---|---|---|
| IMT-2000 Sub | IMT-2000 Network | VMSC Address | N/A (MSRN) |
|  | PDC Network | SMGF Address | RON (as supplied by PDC GLR) |
| PDC Sub | PDC Network | SMGF Address | PST (PDC Subscriber Type) |

The SMSC can categorise short messages and only deliver those that can be handled by the serving handset. Undeliverable messages do not block those that can be delivered. Thus, the SMSC discriminates between text messages, PDC ring-tone down-load messages, and other binary messages. Separate queues are maintained, such that if a message of one category is rejected, messages in other categories can still be attempted.

The following describes signalling scenarios encountered for Mobile Terminated short messages.

1. Short Message from IMT-2000 SMSC to an IMT-2000 Subscriber in the IMT-2000 Network.

Figure 5:
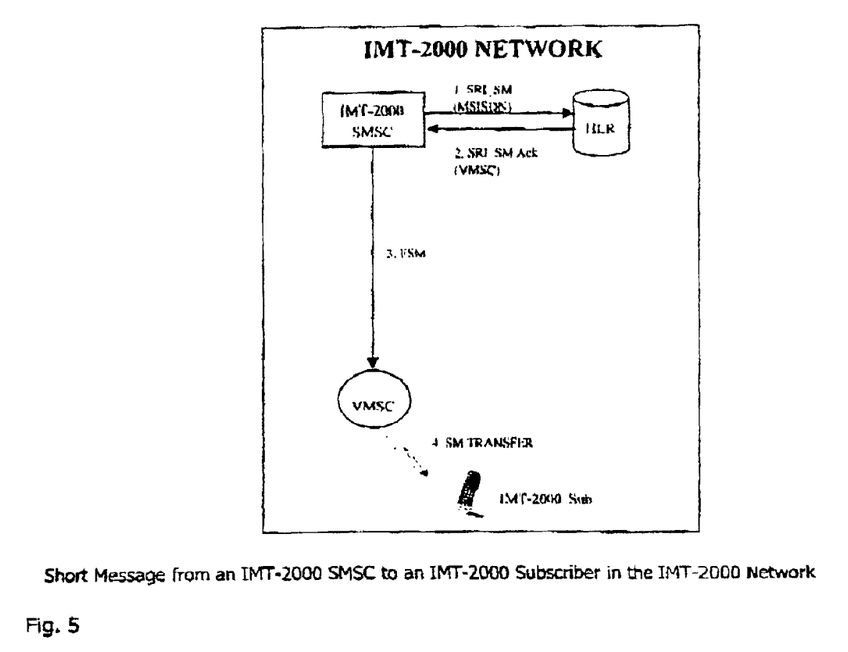
FIGS. 5 to 14 are signal transfer diagrams illustrating short message inter-working scenarios.

FIG. 5 illustrates the signal transfers. The signals 1 to 4 are as follows.

1. The IMT-2000 SMSC initiates a SM (Short Message) delivery by sending a SM routing enquiry to the IMT-2000 HLR. The SM routing enquiry, SRI_SM(Send Routing Info for Short Message), is routed to the appropriate IMT-2000 HLR based on the MSISDN of the destination handset.
2. The IMT-2000 HLR responds to the SRI_SM enquiry with a SRI_SM Ack which contains the address of the serving VMSC.
3. The IMT-2000 SMSC on receipt of the SRI_SM Ack containing the VMSC address will route a FSM(Forward Short Message) to the identified VMSC.
4. The VMSC carries out delivery of the SM to the IMT-2000 handset.

2. Short Messages from an IMT-2000 SMSC to an IMT-2000 Subscriber Roaming in the PDC Network.

Figure 6:
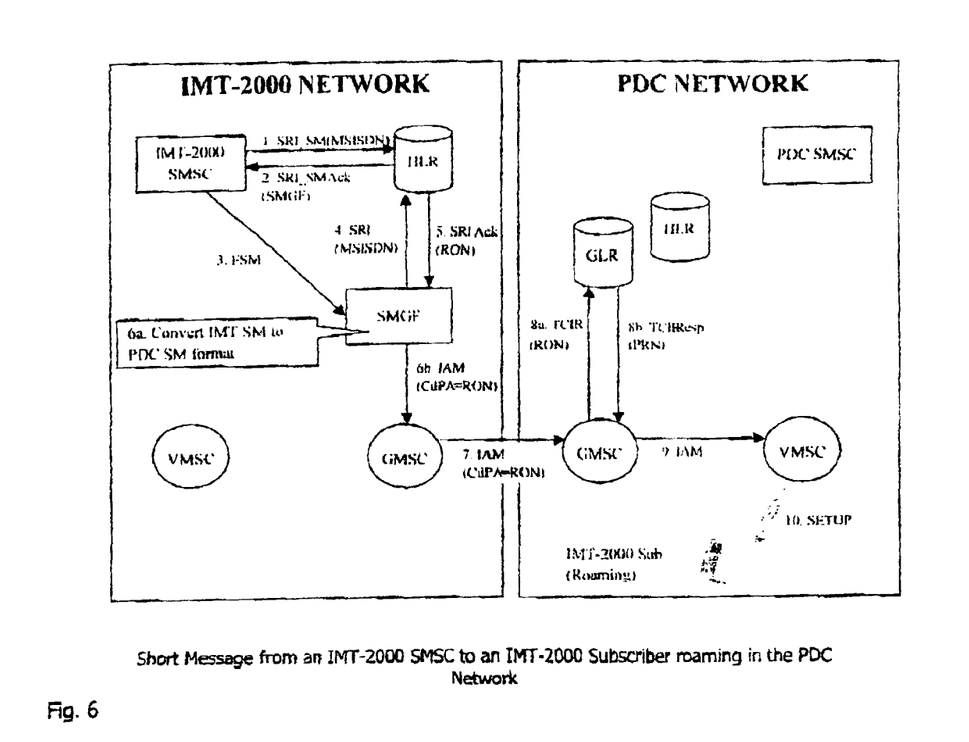

FIG. 6 illustrates the signals 1 to 10 for this scenario as follows.

1. The IMT-2000 SMSC generates a SRI_SM for a SM delivery, which is routed to the appropriate IMT-2000 HLR.
2. The IMT-2000 HLR responds to the SRI_SM enquiry with a SRI_SM Ack which contains the address of the SMGF.

In an IMT-2000 network, when a HLR receives a SRI_SM for a specific MSISDN, one of the key pieces of information it returns to the requester is the address of the serving VMSC for the handset. A key requirement of the SMGF solution is that the IMT-2000 HLR returns the SMGF address as the serving VMSC address in a SRI_SM Ack for IMT-2000 subscribers roaming into the PDC network.

The approach by which the IMT-2000 HLR is updated to indicate the SMGF address for IMT-2000 subscribers roaming in a PDC network is the responsibility of the roaming infrastructure implemented by the network operators. The SMGF solution is independent of this roaming infrastructure.

3. The IMT-2000 SMSC on receipt of the SRI_SM Ack containing the SMGF address will route a FSM to the SMGF indentified.

The SMGF on receipt of a FSM issues a SRI(Send Routing Info), containing the MSISDN of the destination handset, to the appropriate IMT-2000 HLR. The SRI query is used to obtain the MSRN(Mobile Subscriber Roaming Number) of a roaming IMT-2000 subscriber.

4. The IMT-2000 HLR responds to the SRI enquiry with a SRI Ack which contains the MSRN of the roaming IMT-2000 subscriber in the PDC network. The MSRN will contain a PDC roaming number i.e. a RON(ROaming Number). A key requirement here for the SMGF solution is that the IMT-2000 HLR returns the RON in the MSRN field of a SRI Ack for an IMT-2000 subscriber roaming onto the PDC network.

The approach by which the IMT-2000 HLR retreives the MSRN/RON for IMT-2000 subscribers roaming onto the PDC networks, will depend on the roaming infrastructure implemented by the network operators. The SMGF solution is independent of this roaming infrastructure.

5. The SMGF on receipt of a SRI Ack containing a RON, carries out an IMT-2000 SM to PDC SM format conversion. The SMGF then maps the PDC SM to a PDC ISUP IAM message. The CdPA(Called Party Address) in the IAM(Initial Address Message) is populated with the RON and routed to the IMT-2000 GMSC.

6. The IMT-2000 GMSC routes the IAM to the PDC GMSC.

7. The PDC GMSC sends a PDC MAP TCIR(Terminating Call Information Retrevial) request, containing the RON, to the appropriate GLR. The GLR responds with a TCIR response which contains routing information, i.e. the PRN(Pursuit Routing Number) to the serving VMSC in the PDC Network.

8. The PDC GMSC sends the IAM to the VMSC indentified by the PRN.

9. The VMSC initiates paging towards the IMT-2000 subscriber handset and relays the SM via a PDC SETUP message.

3. Short Message from IMT-2000 SMSC to a PDC Subscriber in the PDC Network.

Figure 7:
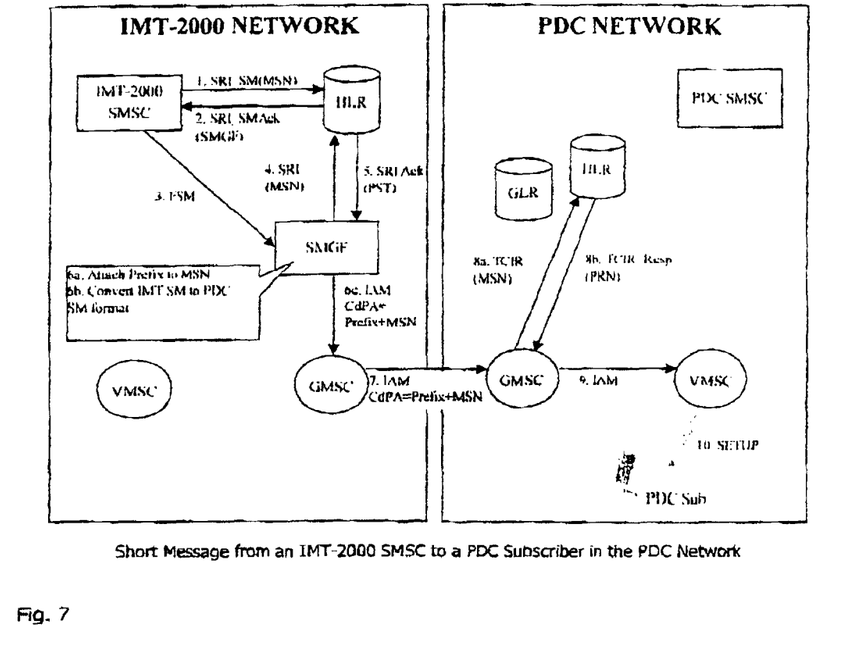

FIG. 7 illustrates the signals 1 to 10 as follows.

1. The IMT-2000 SMSC generates a SRI_SM for a SM delivery which is routed to the appropriate IMT-2000 HLR.

2. The IMT-2000 HLR examines the MSN i.e.the PDC directory number, in the SRI_SM received and identifies it as a PDC number. The IMT-2000 HLR must respond with a SRI_SM Ack identifying the SMGF as the serving MSC. A requirement of the SMGF is that the IMT-2000 HLR returns the SMGF address as the serving VMSC address in a SRI_SM Ack for PDC subscribers in the PDC network.

3. The IMT-2000 SMSC on receipt of the SRI_SM Ack containing the SMGF address routes a FSM to the SMGF indentified.

4. The SMGF, on receipt of a FSM, queries the IMT-2000 HLR for routing information to set up a pseudo call towards the PDC network. The SMGF sends a SRI query, containing the PDC subscriber number, to the IMT-2000 HLR.

5. The IMT-2000 HLR returns an SRI Ack response containing PST(PDC Subscriber Type) information indicating the type of PDC subscriber and the PDC network to which the subscriber is registered.

6. Based on the PST information received in the SRI Ack the SMGF attaches an appropriate prefix number to the subscribers directory number and uses this combination to populate the Called Party Address of an IAM message. The SMGF also carries out an IMT-2000 SM to PDC SM conversion and populates the IAM with this information. The SMGF then sends the IAM to the IMT-2000 GMSC.

7. The IMT-2000 GMSC routes the IAM to the appropriate PDC GMSC based on the attached prefix in the CdPA.

8. The PDC GMSC on receipt of an IAM sends a PDC MAP TCIR(Terminating Call Information Retrevial) request, containing the MSN, to the appropriate PDC HLR. The PDC HLR responds with a TCIR response which contains routing information, i.e. the PRN, to the serving VMSC. It is the responsibility of the PDC GMSC to intrepret correctly the supplied prefix in the CdPA of the IAM.

9. The PDC GMSC sends the IAM to the VMSC indentified by the PRN.

10. The VMSC delivers the SM to the PDC subscriber handset.

4. Short Message from PDC SMSC to a PDC Subscriber in the PDC Network.

Figure 8:
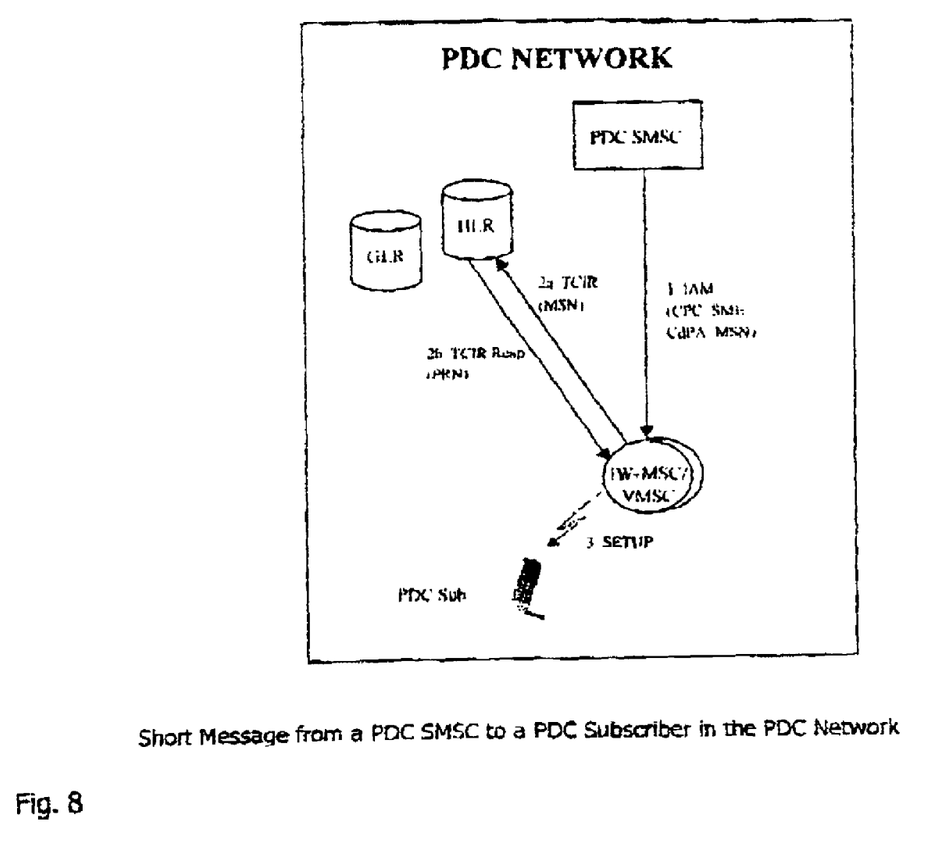

FIG. 8 illustrates signals 1 to 3 as follows.

1. The PDC SMSC routes an IAM, containing the PDC Short Message as user data, to the IW-MSC. The IW-MSC identifies that the IAM is a Short Message call from the value of the CPC(Calling Party's Category) and does not assign a real voice path.

2/3. The signalling is then the same as for any normal call set-up. The IW-MSC sends a routing enquiry message TCIR request to the HLR. The HLR returns a TCIR response which contains routing information to the serving VMSC i.e. the PRN.

The VMSC initiates paging towards the PDC subscriber and delivers the SM via a PDC SETUP message.

5. Short Message from PDC SMSC to an IMT-2000 Subscriber in the IMT-2000 Network.

Figure 9:
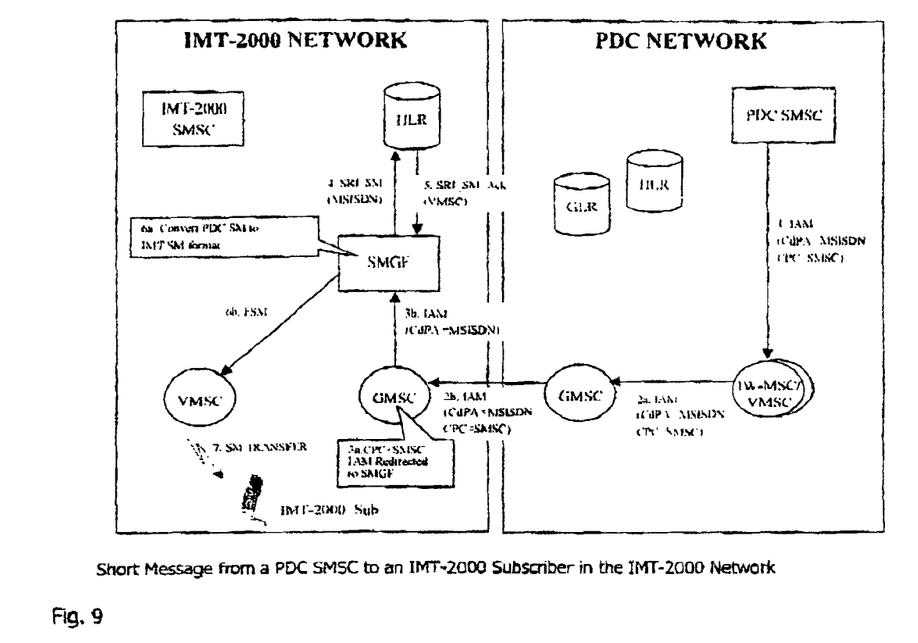

FIG. 9 illustrates the signals 1 to 7 as follows.

1. The PDC SMSC routes an IAM, containing the PDC Short Message as user data, to the IW-MSC.

2. The PDC network routes the call to the IMT-2000 GMSC. (some number portability functionality is needed in the PDC networks if the number is a PDC number ported to the IMT-2000 network).

3. The IMT-2000 GMSC redirects the IAM to the SMGF when the value of the CPC is set to SMSC indicating a Mobile Terminated Short Message IAM. This is a key requirement on the IMT-2000 GMSC for the SMGF solution.

4. The SMGF on receipt of an IAM, detects from the CPC value that it is a MT Short Message call, and sends a SRI_SM populated with the MSISDN/MSN to the appropriate IMT-2000 HLR.

5. The IMT-2000 HLR responds to the SRI_SM with a SRI_SM Ack which contains the address of the serving VMSC.

6. The SMGF on receipt of a SRI_SM Ack containing the VMSC address performs a PDC SM to IMT-2000 SM conversion and sends a FSM to the serving VMSC identified.

7. The VMSC routes the SM to the IMT-2000 subscriber handset.

6. Short Message from PDC SMSC to an IMT-2000 Subscriber Roaming in the PDC Network.

Figure 10:
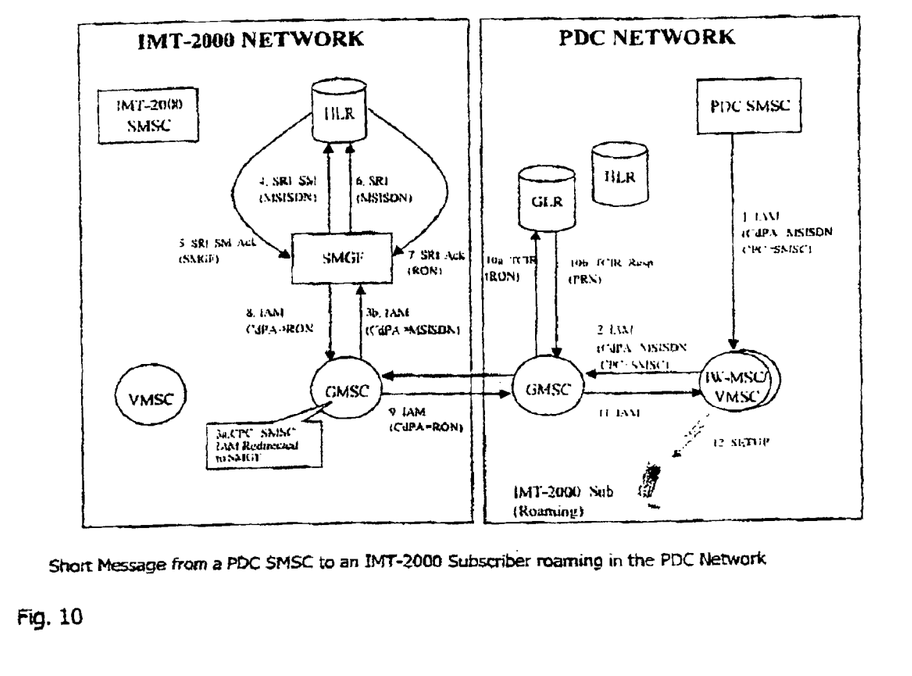

FIG. 10 illustrates signals 1 to 12 as follows.
1. The PDC SMSC routes an IAM, containing the PDC Short Message as user data, to the IW-MSC.
2. The PDC network routes the call to the IMT-2000 GMSC.
3. The IMT-2000 GMSC redirects the IAM to the SMGF when the value of the CPC is set to SMSC
4. The SMGF, on receipt of an IAM, detects from the CPC setting that it is a MT Short Message call and therefore sends a SRI_SM populated with the MSISDN/MSN, to the appropriate IMT-2000 HLR.
5. The IMT-2000 HLR responds to the SRI_SM with a SRI_SM Ack which contains the address of the SMGF as the serving VMSC. As previously stated there is a requirement for the IMT-2000 HLR to return the SMGF address in a SRI_SM Ack for IMT-2000 subscribers roaming in the PDC network.
6. The SMGF, on receipt of a SRI_SM Ack containing the SMGF address, will respond by sending a SRI message to the IMT-2000 HLR.
7. The IMT-2000 HLR returns a SRI Ack with a MSRN populated with a PDC RON.
8. In this case, the SMGF on receipt of a SRI Ack containing a RON, generates a new IAM based on the received IAM and populates the CdPA with the RON. The IAM is then redirected back to the IMT-2000 GMSC.
9. IMT-2000 GMSC routes the IAM to the PDC GMSC.
10. The PDC GMSC queries the GLR for routing information to the serving VMSC i.e. the PRN.
11. The PDC GMSC routes the IAM to the VMSC identified by the PRN.
12. The VMSC initiates paging and delivers the SM to the subscriber handset via a SETUP message.

7. Short Message from PDC SMSC to a subscriber with a Ported IMT-2000 Number in the PDC Network.

Figure 11:
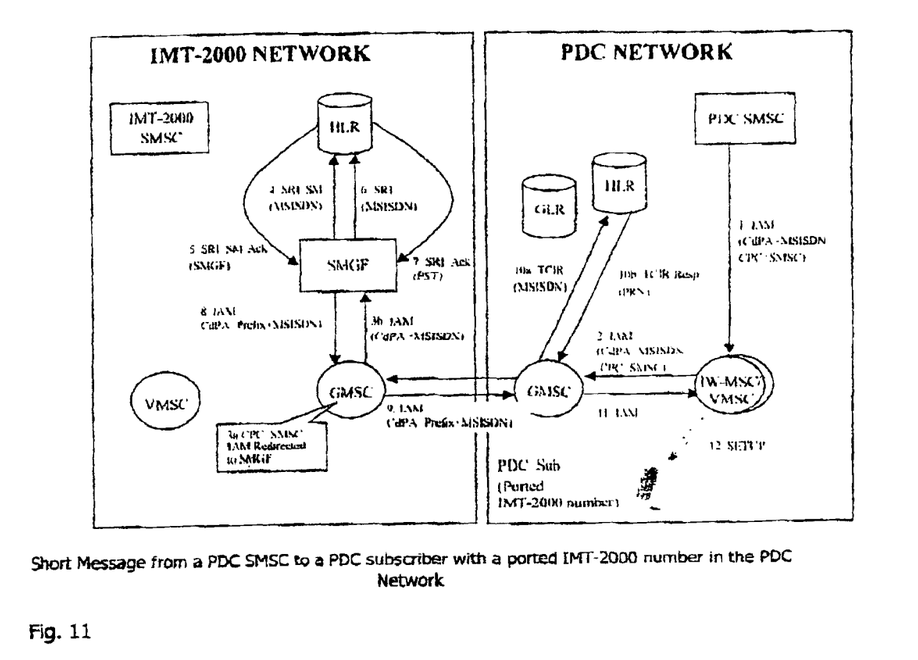

FIG. 11 illustrates signals 1 to 12 as follows.
1. The PDC SMSC routes an IAM, containing the PDC Short Message as user data, to the IW-MSC.
2. The PDC network routes the call to the IMT-2000 GMSC. In this particular case, where the source and destination PDC networks are the same, the routing of the call to the IMT-2000 network could be eliminated if the PDC IW-MSC, on receipt of the initial IAM, does a query to the PDC HLR which would return routing information for the PDC subscriber with a ported IMT-2000 MSISDN. If this were the case then this scenario would be exactly the same as delivering a SM to a PDC subscriber which has a PDC directory number as indicated in section.
3. The IMT-2000 GMSC redirects the IAM to the SMGF when the value of the CPC is set to SMSC.
4. The SMGF, on receipt of an IAM, detects from the CPC that the call is a MT Short Message and sends a SRI_SM with a CdPA(Called Party Address) set to the MSISDN, to the IMT-2000 HLR.
5. The IMT-2000 HLR identifies that the MSISDN number queried in the SRI_SM is a PDC subscriber with a ported IMT-2000 number and hence returns the SMGF address in the SRI_SM Ack. As previously stated this is a requirement on the IMT-2000 HLR for the SMGF solution.
6. The SMGF, on receipt of a SRI_SM Ack containing the SMGF address, responds by sending a SRI message, populated with the MSISDN, to the IMT-2000 HLR.
7. The IMT-2000 HLR returns an SRI Ack response containing PST(PDC Subscriber Type) information indicating the type of PDC subscriber and the PDC network to which the subscriber is registered.
8. Based on the PST information received in the SRI Ack the SMGF attaches an appropriate prefix number to the subscribers directory number and use this combination to populate the Called Party Address of an IAM message. The SMGF also carries out an IMT-2000 SM to PDC SM conversion and populates the IAM with this information. The SMGF then sends the IAM back to the IMT-2000 GMSC.
9. The IMT-2000 GMSC routes the IAM to the PDC GMSC based on the prefix of the CdPA.
10. The PDC GMSC, on receipt of the IAM, queries the appropriate PDC HLR for routing information to the serving VMSC. This returns the PRN. It is the responsibility of the PDC GMSC to intrepret the prefix in th CdPA appropriately.
11. The PDC GMSC routes the IAM to the VMSC identified by the PRN.
12. The VMSC initiates paging and delivers the SM to the subscriber handset via a SETUP message.

8. Short Message from IMT-2000 subscriber in the IMT-2000 Network to its Home IMT-2000 SMSC.

Figure 12:
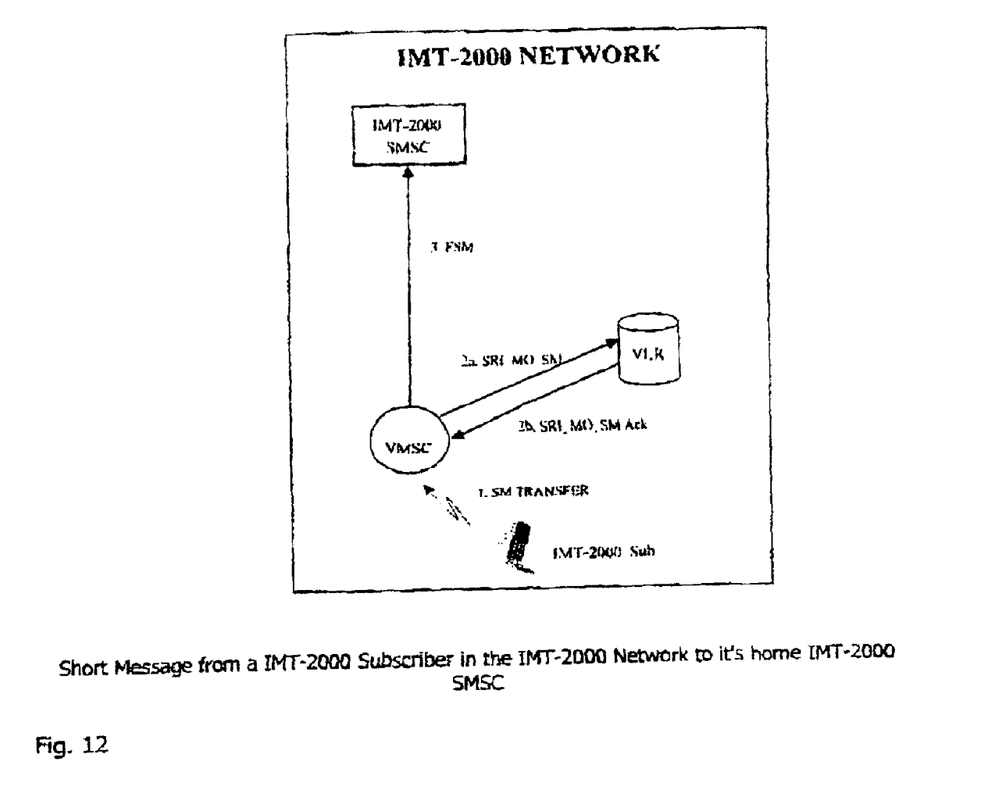

FIG. 12 illustrates signals 1 to 3 as follows.
1. An IMT-2000 subscriber initiates delivery of a short message. The short message transferred to the serving VMSC contains the Service Centre address of the home IMT-2000 SMSC.
2. The serving VMSC sends a SRI_MO_SM ( Send Routing Info for MO SM) to the VLR to check the subscriber related information. The VLR returns a SRI_MO_SM Ack confirming the subscriber information.
3. The VMSC on receipt of a positive SRI_MO_SM Ack, sends a FSM to the home IMT-2000 SMSC identified by the Service Centre address received from the mobile station.

9. Short Message from IMT-2000 Subscriber Roaming in a PDC Network to its Home IMT-2000 SMSC.

Figure 13:
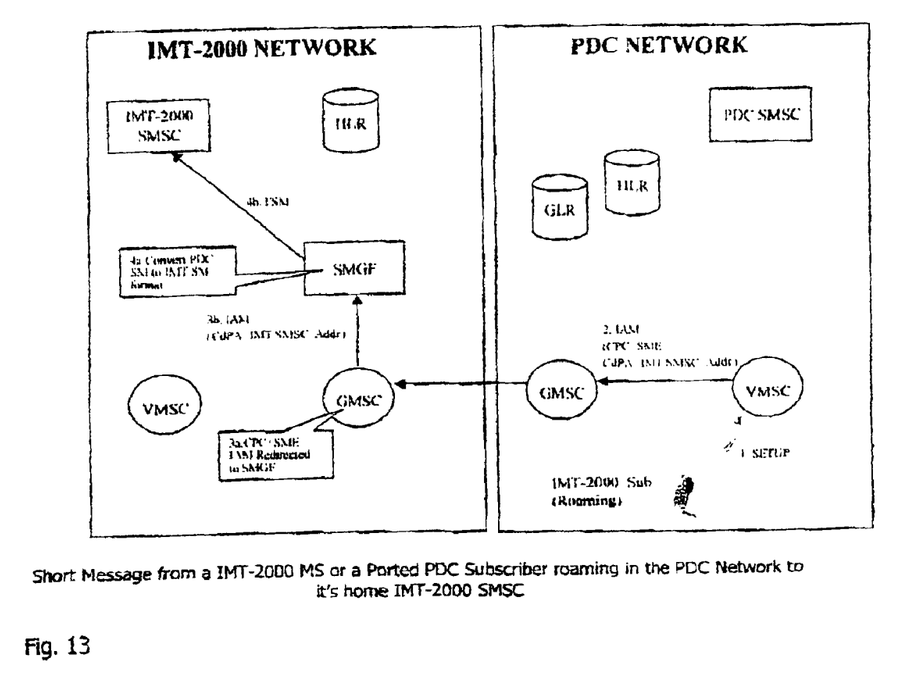

FIG. 13 illustrates signals 1 to 4 as follows.
1. An IMT-2000 subscriber roaming in the PDC network, initiates a short message delivery. A SETUP message, which contains the home IMT-2000 SMSC Service Centre address, is sent to the serving VMSC.
2. The VMSC routes an IAM message, which has it's CdPA set to the IMT-2000 SMSC address, to the IMT-2000 GMSC.
3. The IMT-2000 GMSC reroutes the IAM to the SMGF based on the CPC indicating SME i.e.a Mobile Originated Short Message IAM call. This is a key requirement of the IMT-2000 GMSC for the SMGF solution.
4. The SMGF, on receipt of an IAM, detects from the CPC setting that this is a Mobile Originated Short Message call and therefore carries out a conversion of the PDC SM to a IMT-2000 SM format. The IMT-2000 SM is then forwarded in a FSM to the IMT-2000 SMSC.

10. Short Message from PDC Subscriber in the PDC Network to its Home PDC SMSC.

Figure 14:
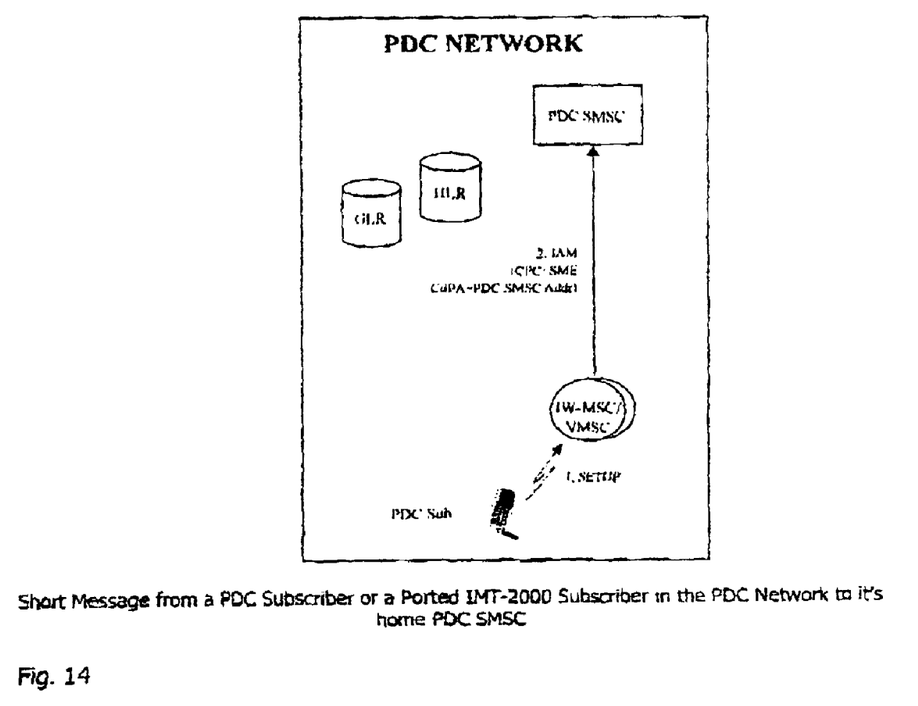

FIG. 14 illustrates signals 1 and 2 as follows.
1. An PDC subscriber initiates a short message delivery. A call SETUP message, which contains the home PDC SMSC address, is sent to the serving VMSC.
2. The VMSC routes an IAM to the home PDC SMSC.

It will be appreciated that the invention provides for comprehensive and versatile SM communication across different networks. This is achieved without modification of one of the networks.

The invention is not limited to the embodiments described but may be varied in construction and detail.

What is claimed is:

1. A short message gateway comprising a gateway function (SMGF) comprising means for inter-working with entities of non-compatible cellular networks and for performing short message format conversion between the networks,
   wherein the gateway function comprises means for residing in a home network and for performing inter-working functions between the home network and a foreign network without modification of the foreign network,
   wherein the gateway function comprises means for communicating with the foreign network via gateway mobile switching center (G-MSC) in the home network, and
   wherein the gateway further comprises means in a Home Location Register (HLR) of the home network for returning an address for the gateway function as a serving VMSC or as a home SMSC, depending on the nature of the signals.

2. The short message gateway as claimed in claim 1, wherein the gateway function comprises means for inter-working between a plurality of similar networks on one side and a different, non-compatible, network on the other side.

3. The short message gateway as claimed in claim 1, wherein the HLR comprises means for providing to the gateway function a MSRN of a roaming subscriber in a foreign network.

4. The short message gateway as claimed in claim 1, wherein the HLR comprises means for providing the gateway function with routing data for a call to a foreign subscriber.

5. The short message gateway as claimed in claim 1, wherein the gateway function further comprises means for capturing short message statistical data at configurable intervals.

6. The short message gateway as claimed in claim 1, wherein the gateway function comprises means for maintaining a table of corresponding message classes and tele-services, and for using said table for message class and tele-services conversion.

7. The short message gateway as claimed in claim 1, wherein the gateway function comprises a programmable mapping function between data coding schemes, said mapping function being controlled by instructions in the form of operator commands and a configuration file.

8. The short message gateway as claimed in claim 1, wherein the gateway function comprises means for converting a release message into independent messages.

9. The short message gateway as claimed in claim 1, wherein the gateway function comprises means for segmentation of messages if a network has a shorter maximum message length than another network.

10. The short message gateway as claimed in claim 1, wherein the gateway function comprises means for maintaining a network transaction log of diagnostic data.

11. A short message gateway comprising a gateway function (SMGF) comprising means for inter-working with entities of non-compatible cellular networks and for performing short message format conversion between the networks,
    wherein the gateway function comprises means for inter-working between a plurality of similar networks on one side and a different, non-compatible, network on the other side,
    wherein the gateway function comprises means for residing in a home network and for performing inter-working functions between the home network and a foreign network without modification of the foreign network,
    wherein the gateway function comprises means for communicating with the foreign network via a gateway mobile switching center (G-MSC) in the home network,
    wherein the gateway further comprises means in a Home Location Register (HLR) of the home network for returning an address for the gateway function as a serving VMSC or as a home SMSC depending on the nature of the signals,
    wherein the HLR comprises means for providing to the gateway function a MSRN of a roaming subscriber in a foreign network,
    wherein the HLR comprises means for providing the gateway function with routing data for a call to a foreign subscriber, and
    wherein the gateway function comprises means for converting a release message into independent messages.

* * * * *